United States Patent
Siagian et al.

(10) Patent No.: US 11,871,068 B1
(45) Date of Patent: Jan. 9, 2024

(54) TECHNIQUES FOR DETECTING NON-SYNCHRONIZATION BETWEEN AUDIO AND VIDEO

(71) Applicant: Amazon Technologies, Inc., Seattle, WA (US)

(72) Inventors: Christian Garcia Siagian, Los Angeles, CA (US); Ryan Barlow Dall, Los Angeles, CA (US); Charles Effinger, Los Angeles, CA (US); Ramakanth Mudumba, Lake Forest, CA (US)

(73) Assignee: Amazon Technologies, Inc., Seattle, WA (US)

( * ) Notice: Subject to any disclaimer, the term of this patent is extended or adjusted under 35 U.S.C. 154(b) by 654 days.

(21) Appl. No.: 16/712,470

(22) Filed: Dec. 12, 2019

(51) Int. Cl.
*H04N 21/43* (2011.01)
*H04N 5/06* (2006.01)
*G06V 20/40* (2022.01)
*G06V 40/16* (2022.01)
*H04N 21/233* (2011.01)

(52) U.S. Cl.
CPC ......... *H04N 21/4307* (2013.01); *G06V 20/46* (2022.01); *G06V 40/165* (2022.01); *G06V 40/171* (2022.01); *H04N 5/06* (2013.01); *H04N 21/233* (2013.01); *H04N 21/4302* (2013.01)

(58) Field of Classification Search
CPC .................................................. H04N 21/4307
See application file for complete search history.

(56) References Cited

U.S. PATENT DOCUMENTS

| | | | | |
|---|---|---|---|---|
| 5,387,943 A | * | 2/1995 | Silver | H04N 5/222 348/E5.022 |
| 5,572,261 A | * | 11/1996 | Cooper | H04N 17/00 382/209 |
| 6,181,383 B1 | * | 1/2001 | Fox | H04N 21/4347 375/E7.278 |
| 2003/0198256 A1 | * | 10/2003 | Wang | H04N 21/4341 370/503 |
| 2004/0100582 A1 | * | 5/2004 | Stanger | H04N 21/4305 348/E5.002 |
| 2007/0153089 A1 | * | 7/2007 | Cooper | H04N 21/2368 375/E7.271 |

(Continued)

*Primary Examiner* — Brian T Pendleton
*Assistant Examiner* — Frank Johnson
(74) *Attorney, Agent, or Firm* — Kilpatrick Townsend & Stockton LLP

(57) ABSTRACT

Techniques for identifying synchronization errors between audio and video are described herein. Audio portions in audio for media content may be identified based at least in part on a sound level associated with first respective segments of the audio portions. A subset of the audio portions may be selected based at least in part on a duration associated with the audio portions. For a segment of the subset a first number of frames in the audio and a second number of frames in the video for the segment may be determined. A determination may be made that the segment includes a conversation segment based at least in part on the first number of frames, the second number of frames, and a first threshold. A synchronization error may be identified in the conversation segment based on a difference between the audio and the video of the conversation segment.

14 Claims, 8 Drawing Sheets

(56) References Cited

U.S. PATENT DOCUMENTS

| | | | |
|---|---|---|---|
| 2014/0270680 A1* | 9/2014 | Bloch | G11B 27/11 |
| | | | 386/201 |
| 2016/0134785 A1* | 5/2016 | Greene | G06V 40/168 |
| | | | 348/500 |
| 2016/0286260 A1* | 9/2016 | Lawrence | H04N 21/43072 |
| 2019/0098067 A1* | 3/2019 | Sandoval | H02J 13/00024 |
| 2020/0021880 A1* | 1/2020 | Rekstad | H04N 7/04 |
| 2020/0076988 A1* | 3/2020 | Aides | G06V 20/40 |
| 2021/0219012 A1* | 7/2021 | Maurice | H04N 21/4302 |

* cited by examiner

TECHNIQUES FOR DETECTING NON-SYNCHRONIZATION BETWEEN AUDIO AND VIDEO

BACKGROUND

Current media content typically includes video and audio portions which coincide with each other, whether it be a musical score that accompanies a scene or dialogue between characters. However, as media content is encoded or formatted for various platforms and devices, synchronization errors between the audio of the media content and the video of the media content can occur. The synchronization errors can detract from the experience of and/or confuse the viewer, as certain dialog may be attributed to an incorrect character. Conventional methods of correction (e.g., identifying synchronization errors between audio and video) which rely on manual input, are inefficient and labor intensive.

BRIEF DESCRIPTION OF THE DRAWINGS

Various embodiments in accordance with the present disclosure will be described with reference to the drawings, in which.

DETAILED DESCRIPTION

Figure 1:
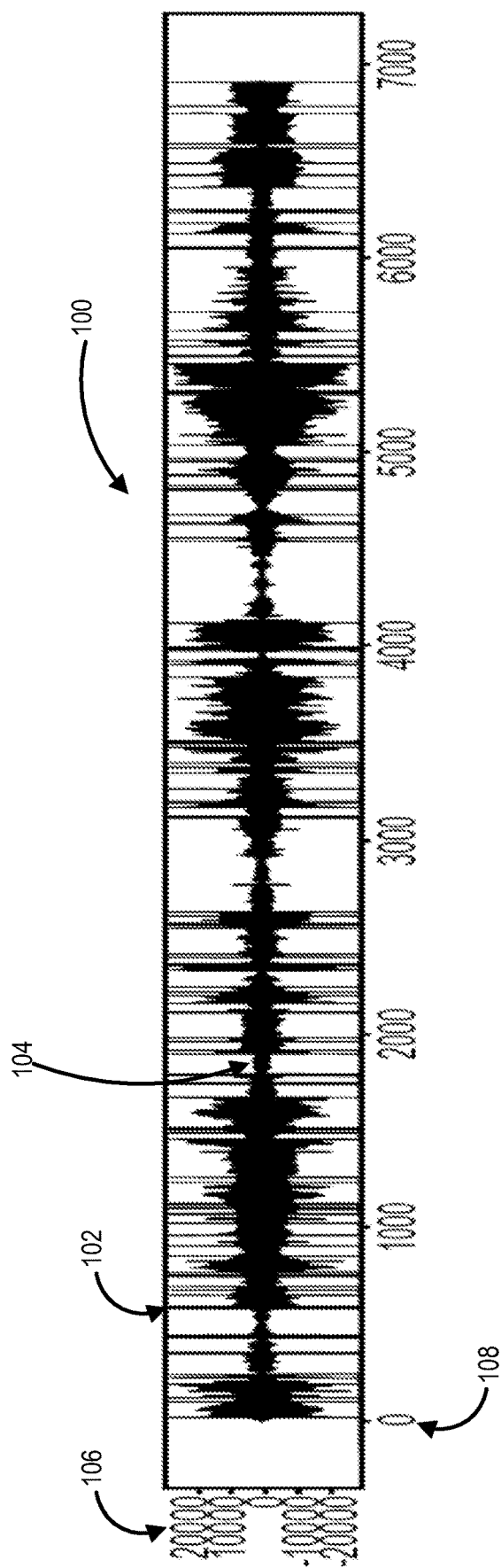
FIG. 1 illustrates an example audio portion of media content identified in a synchronization feature implemented by a service provider computer, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide a synchronization feature for identifying synchronization errors between audio and corresponding video for media content. A synchronization error between the audio and video components of media content may identified by the audio and video components not lining up. For example, a character in the media content may be speaking yet the video for this portion of the media content may show the character with a closed mouth. In another example, the audio may be presented after the media content has transitioned to another scene. Other examples of a synchronization error may include the audio for one character (e.g., the character's voice) being presented while another character in the video appears to be talking (e.g., the audio is not presented with correlating video from the correct character or actor). In some examples, a service provider computer implementing the synchronization features described herein may identify and analyze portions of the audio and the video of the media content to identify synchronization errors without requiring analysis of the full duration of the media content, thereby saving time and computer resources.

In accordance with at least one embodiment, the service provider computer can identify portions of audio which may include potential conversation segments based at least in part on a sound level associated with each portion of the audio of the media content. In embodiments, the synchronization feature may detect portions of audio and video of media content which correspond to a conversation segment of the media content. Portions of the audio of the media content may be analyzed to detect sound levels which correspond typically to conversations between characters, actors, or entities within the media content. The portions of the audio may be associated with information which correlates the audio to video of the media content such as by identifying a frame at which an audio signal or sound is to be interleaved into the presentation of the video during presentation of the media content. By identifying the portions of audio which likely have a conversation segment based on the sound levels further analysis can be performed on the corresponding video frames. For example, the service provider computers implementing the synchronization feature may identify or detect a presence of a facial images within the video frames of the video that corresponds to the portion of the audio that is potentially associated with a conversation segment. A number of frames of the audio portions and a number of frames of the video portion of the potential conversation segment may be compared to a threshold to determine, by the service provider computers, that a conversation segment is likely included in the audio portions and video portion. Once a determination of one or more conversation segments of the media content have been made by the service provider computers, an identification of a synchronization error may be made utilizing the synchronization features described herein. For example, the service provider computers may identify a synchronization error when a presence of an open mouth facial image is detected within a video frame but no corresponding audio is present. The service provider computers may determine that the media content includes a synchronization error based on one or more of the conversation segments including a synchronization error.

As an illustrative example of a synchronization error detected by implementation of the synchronization features described herein a movie may be considered. An example of a synchronization error in a movie may include a scene of dialog between two characters of the movie. In the scene, one character may speak with the camera focused on the characters face. However, the sound interleaved or presented with this scene has an error which causes the sound to not be presented in synchronization with the movement or speech patterns of the character. This can display itself by having the audio be presented with a lag time such that the character speaking has sound presented just after the character has completed making the mouth or facial movements that would normally be associated with such a sound. In some cases the synchronization error can be such that dialog that is supposed to be spoken by one character in the scene is actually presented when the camera focuses on another character and their facial movements and mouth movements which causes confusion to viewers as to which character and voice is attributed to which character. Other examples of synchronization errors may be apparent during presentation of media content such as a movie where dialog is presented long after a scene with characters is presented or before the scene is presented.

As used herein, a conversation segment includes a segment or portion of the media content where a presented character of the media content is speaking, singing, etc., whether it be to another character, the audience, or merely narrating. In accordance with at least one embodiment, the service provider computer may be configured to identify the conversation segments included in the media content and analyze the audio and the video of the conversation segments to determine that synchronization errors for the media content exist. For example, if a certain number of the conversation segments include synchronization errors than the media content may be identified as including synchronization errors and further correction of the synchronization errors may be performed by the service provider computers or other entities. In accordance with at least one embodiment, the service provider computers may extract or parse out the audio of the media content from the video of the media content to identify potential conversation segments. In some embodiments, the service provider computers may receive or otherwise obtain separate audio and video files of the media content such that no extraction or parsing is necessary. The service provider computers may classify the audio of the media content according to the associated sound level. In accordance with at least one embodiment, the service provider computer may be configured to utilize an algorithm that analyzes the sound levels associated with portions of the audio content to classify the associated audio as quiet/silent or loud. As used herein sound levels may include an associated decibel level or amplitude level for audio of the media content.

In embodiments, conversation segments for media content typically include sound levels that are classified as quiet/silent as opposed to loud by the algorithm implemented by the service provider computer. For example, the overall noise and audio for a movie may be reduced during a segment of the movie (e.g., a conversation segment) that is being presented so that the viewers can properly hear the dialogue being spoken between characters. During other portions of a movie, such as during a chase scene, the music and sound effects may raise the sound level to such a point that the algorithm would classify that portion of the movie as loud and therefore unlikely to include a conversation segment. In accordance with at least one embodiment, the service provider computer implementing the synchronization feature may filter the identified audio portions that correspond to potential conversation segments (e.g., those segments of audio which have been classified or identified as including a quiet sound) based on a duration of the audio portions. For example, quiet sound classified segments of the audio for the media content which are below a certain duration may be removed as they are likely unrelated or do not include a potential conversation segment as typical conversation segments are of a longer duration. In embodiments, the duration may be specified by a content creator of the media content or by an entity associated with the service provider computers.

In some embodiments, another classification or identification of the audio portions that exceed the duration may be performed by the service provider computers to further identify the audio portions of the audio of the media content which correspond to a conversation segment of the media content. In embodiments, the service provider computers may determine the number of silent or quiet frames (e.g., those portions of the audio included in segments that have been classified or identified as silent or quiet) in each potential conversation segment identified subsequent the classification and parsing for certain durations. The service provider computers may determine the number of frames in the corresponding video of each potential conversation segment that include a facial image. In embodiments, the service provider computer may utilize a facial recognition algorithm to identify facial images included in the video of the media content to determine the number of frames that include a facial image. Once the number of frames for the audio and video have been determined, the service provider computers may compare the frames containing quiet audio and facial images to a threshold to determine that the analyzed segment of the audio includes a conversation segment.

In accordance with at least one embodiment, once a segment of the audio and video of the media content has been determined to include a conversation segment a further analysis can be performed to identify a synchronization error by identifying the presence of an open mouth facial image and an absence of sound in the corresponding audio. As described herein, a synchronization error can also include the presence of a closed mouth facial image and the presence of sound. In embodiments, the number of audio and video inconsistencies or differences between the video and expected audio can be compared to another threshold to determine that the entirety of the media content includes synchronization errors and that further correction is required. In accordance with at least one embodiment, the service provider computers may modify an encoding of the media content or modify a metadata file that is configured to implement presentation of the media content to automatically correct the synchronization error(s) for the media content.

The techniques described herein are an improvement on conventional synchronization error detection and correction methods for media content. For example, conventional methods for identifying and correcting synchronization errors include manually identifying or relying on input from users to identify any synchronization errors subsequent to consuming the media content which can ruin the experience and be a time-consuming process. Further, conventional identification methods include manually analyzing the entire duration of the media content to identify synchronization errors. Conventional correction methods may include manually correcting the synchronization errors, reporting issues to other entities such as producers of the content to fix, or other time inefficient solutions. The methods and systems described herein provide for more efficient and automatic identification of synchronization errors between audio and video for media content. Automatic correction of identified synchronization errors can also be achieved utilizing the techniques described herein. The service provider computers implementing the synchronization feature can automatically process and identify the synchronization errors absent any user input and prior to consumption by users. This can reduce the time to identify and correct errors as well as maintain the immersion and enjoyment of users who are consuming the content.

Further, computer resource utilization savings can be achieved via the methods and systems described herein as conventional methods of processing audio and video of media content to identify errors can be time consuming. For example, conventional methods of processing media content to identify synchronization errors involve analyzing the entire length of the media content. However, the methods and systems described herein utilize a synchronization feature that analyzes portions of the audio and video of media content which correspond to conversation segments to determine that synchronization errors exist within the media content. Moreover, once conversation segments have been determined for the media content, the service provider computer can utilize distributed computing systems to perform parallel processing of each conversation segment to identify the synchronization errors thereby providing improved efficiencies over conventional manual identification. The service provider computers implementing the synchronization feature can also automatically modify an encoding for the media file or modify an associated metadata file to correct the identified synchronization errors. The synchronization feature described herein is also language agnostic as audio to video synchronization errors can still be identified utilizing the techniques described in the current disclosure for media content that is dubbed or utilizes other languages than the English language.

FIG. 1 illustrates an example audio portion of media content identified in a synchronization feature implemented by a service provider computer, in accordance with at least one embodiment. FIG. 1 includes a representation 100 of the audio of media content analyzed by the service provider computers implementing the synchronization features described herein. In embodiments, the service provider computer may parse or extract the audio of media content to identify or classify the sound levels associated with each detected audio signal of the audio of the media content. The particular data points 102 and 104 of the representation 100 of the audio of the media content represent the detected audio signal which corresponds to sound levels detected for portions or segments of the audio of the media content by the service provider computers implementing the synchronization feature described herein. For example, the representation 100 of the audio of the media content may represent the audio for the entire duration of the media content where 106 includes the units of the sound level in decibels as well as the frames 108 of the media content where the data points 102, 104, and others are detected or obtained at within the media content.

In accordance with at least one embodiment, the service provider computer may implement an algorithm that classifies or identifies each detected audio signal as quiet or silent (e.g., of a certain sound level that is typically associated with a conversation in media content) or loud/noise (e.g., of a certain sound level that is typically not associated with a conversation in media content). For example, the service provider computers may classify an audio portion that includes multiple audio signals similar to that as 102 as loud as the signals exceed 20 kilo-decibels. To continue the example with reference to FIG. 1 the service provider computers may classify a different audio portion that includes multiple audio signals similar to that as 104 as quiet or silent as the signals are below 10 kilo-decibels. Although the description of FIG. 1 includes decibels the synchronization feature can also utilize amplitude or other sound characteristics to determine that detected audio signals and classify or identify the signals or portion of the signals as quiet or loud. In embodiments, the frames 108 correlate the detected audio signals such as 102 and 104 to corresponding video frames for the video of the media content. In accordance with at least one embodiment, the service provider computers may train and implement a deep neural network algorithm that is configured to detect audio signals of media content and classify or identify portions of the audio of the media content as loud or quiet.

In embodiments, the deep neural network algorithm may be trained using predetermined or pre-classified audio signals from other media content. In accordance with at least one embodiment, the service provider computers may further identify or detect certain transition points in the audio where no or even less audio than the classified or identified quiet audio portions exists. The service provider computers may utilize the determined transition points in the audio to identify potential conversation segments by modifying the duration of a potential conversation segment of audio based on the transition point.

Figure 2:
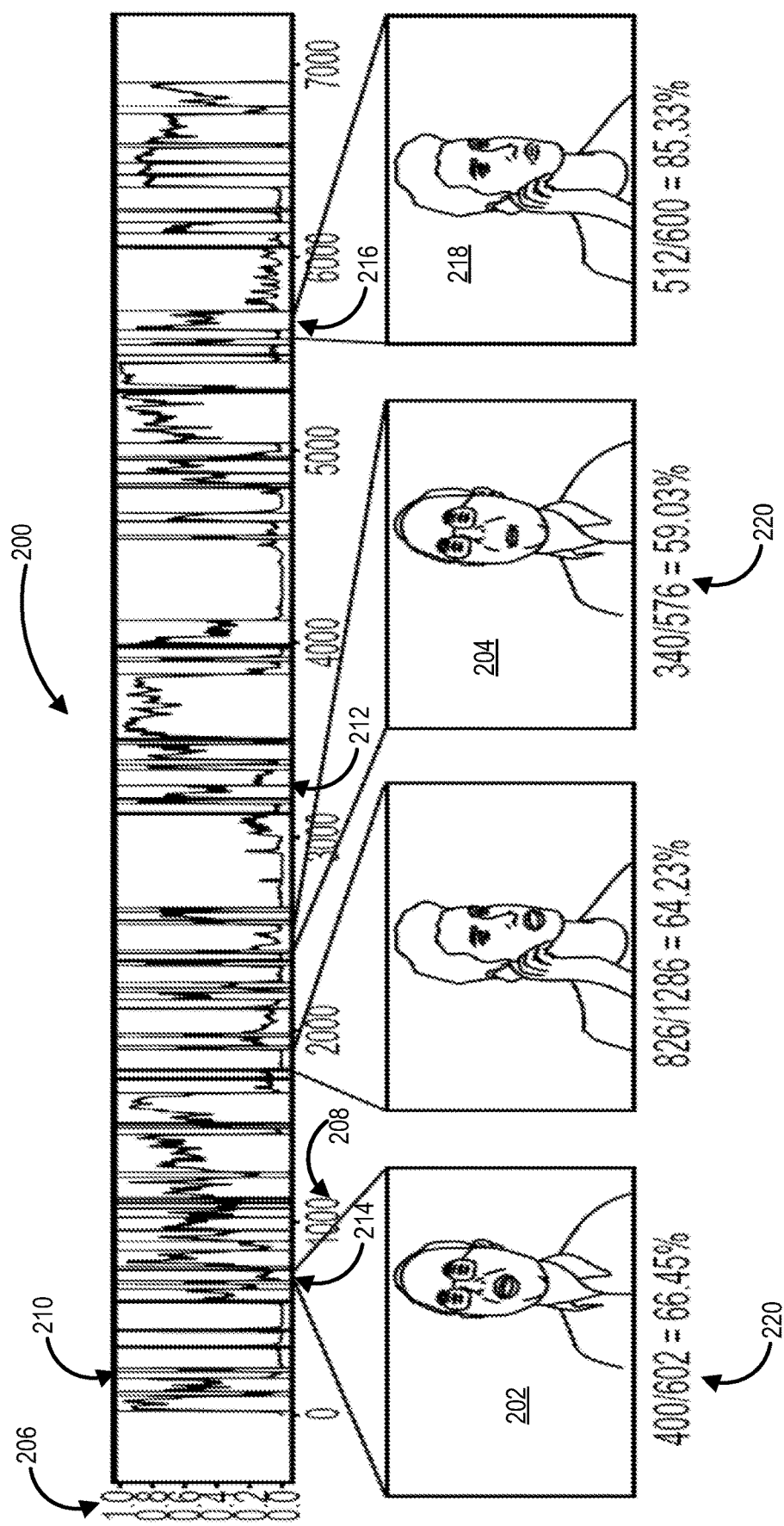
FIG. 2 illustrates an example audio portion of media content with corresponding video portions for identifying a conversation segment in a synchronization feature implemented by a service provider computer, in accordance with at least one embodiment.

FIG. 2 illustrates an example audio portion of media content with corresponding video portions for identifying a conversation segment in a synchronization feature implemented by a service provider computer, in accordance with at least one embodiment. FIG. 2 illustrates audio representation or classification result 200 and corresponding video portions 202 and 204. The audio representation 200 is similar to the audio representation 100 but with a different scale that normalizes the sound level for the audio portions thereby illustrating the quiet and loud portions of the audio of the media content along with associated video content 202 and 204. The audio representation 200 of FIG. 2 includes the units 206 of the detected audio as well as the frames 208 where the audio is detected for the media content. FIG. 2 depicts a designation of an audio signal 210 and 212 with the audio signal 210 corresponding to a loud detected audio signal and audio signal 212 corresponding to a quiet audio signal.

In embodiments, the service provider computer may identify or determine that a portion of detected audio signals or a segment of the audio signals, such as audio signals 210 or 212, are identified or classified as quiet or loud. In accordance with at least one embodiment, the service provider computers may parse or filter out detected audio signal portions or signals that are designated as quiet or silent but that are below a certain duration. In embodiments, the service provider computers may classify or identify the audio signals that were not parsed out or filtered out (e.g., exceed the duration) to further identify or classify the included audio signals as quiet or loud. In accordance with at least one embodiment, the service provider computers implementing the synchronization feature may implement a smoothing function or normalizing function which re-classifies the detected audio signals for portions or segments of the audio of the media content over a different duration than what was utilized in an initial classification or identification of the audio portions.

The corresponding video portions 202 and 204 each represent a different potential conversation segment of the media content associated with the audio representation 200. As described herein, the audio of the media content may include video frame information that identifies the corresponding video frame that is intended for the audio to be interleaved with or presented simultaneously with the video of the media content. As illustrated in FIG. 2, a potential conversation segment may include the audio portion 214 and video 202. Another potential conversation segment may include the audio portions 216 and video 218. As described herein, the service provider computer may determine a number of frames that correspond to the audio portion 214 and the number of frames in the video frames for video portion 202 to determine a ration or percentage 220. The ratio or percentage 220 may include the number of frames of audio of the portion 214 that include an identified or classified quiet audio and the number of corresponding video frames of the video portion 202 that include facial images. In accordance with at least one embodiment, the service provider computers may utilize a facial image recognition algorithm to identify facial images in the video portion 202.

The number of frames of the quiet audio versus the number of frames that include the facial images result in a ratio or percentage that can be compared to a threshold to determine, by the service provider computers, that the analyzed segment of audio and video includes a conversation segment. In embodiments, a content creator of the media content that corresponds to the audio representation 200 or an entity associated with the service provider computers may specify the threshold utilized to determine that an analyzed portion of audio and video includes a conversation segment. As certain portions of the audio and the video of the media content are determined to be conversation segments the service provider computers may further analyze just these segments to determine that synchronization errors are present in the corresponding media content without the requirement to process every included audio signal or video frame. In embodiments, the threshold for determining that the number of audio frames that are designated as quiet and the video frames that include a facial image include a conversation segment may be based at least in part on a type of the media content. For example, animated media content may have a less stringent threshold whereas high monetary big production films may have a more stringent threshold.

Figure 3:
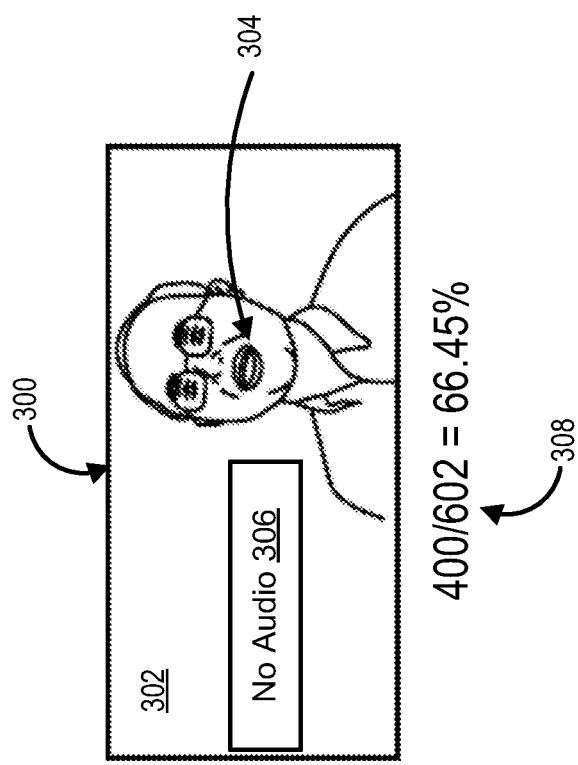
FIG. 3 illustrates an example of an identified synchronization error determined by a synchronization feature implemented by a service provider computer, in accordance with at least one embodiment.

FIG. 3 illustrates an example of an identified synchronization error determined by a synchronization feature implemented by a service provider computer, in accordance with at least one embodiment. FIG. 3 includes a representation of a video portion 300 of media content. The representation of the video portion 300 may include a video frame that further includes a facial image 302. It should be understood that the depicted video portion 300 of the facial image 302 is a single video frame of one or more consecutive video frames included in the video portion 300. As described herein, the service provider computers may determine that an identified or determined conversation segment includes a synchronization error based at least in part on multiple scenarios. FIG. 3 illustrates one such scenario where a certain ratio of video frames which include a facial image, such as the facial image 302, are detected as having an open mouth facial image, such as open mouth facial image 304 but no audio. The lack of audio in FIG. 3 is represented by the no audio 306 and further represents that no audio is present in the corresponding audio frames for this portion of the media content. In accordance with at least one embodiment, if a certain number of conversation segments include similar synchronization errors, the service provider computers may designate or determine that the media content includes synchronization errors. The certain ratio of frames that include video frames which include an open mouth facial image 304 but no audio 306 is depicted in FIG. 3 as ratio 308. The ratio 308 may be compared to a threshold to determine that the conversation segment includes a synchronization error.

In accordance with at least one embodiment, the server computers implementing the synchronization feature may analyze a certain number of previous video frames from a potentially synchronization error including video frame to identify whether the character or person included in the video frame is merely leaving their mouth open for dramatic or comedic effect and is intended to not include corresponding audio. The server computers may identify in the analyzed video frames movement between the lips of a character or person included in the video frames using a facial landmarking algorithm. This analyzing of video frames prior to a detection of an open mouth facial image 304 and no audio 306 can be used to clean up the ratio of truly silent frames that include a synchronization error to those frames which are intended to have no audio provided by the on screen character or person. In embodiments, the facial landmarking algorithm can determine the distance between the upper lip and the lower lip of the character or person to detect movement, which would indicate conversation, versus a lack of movement, which would indicate the intention to leave the mouth open for dramatic or comedic effect.

Other scenarios are discussed below with reference to FIG. 4. In embodiments, once the media content has been designated as including synchronization errors, the service provider computer can modify an encoding of the media content to correct the synchronization error. In some embodiments, the service provider computer may modify a metadata file associated with the media content that is utilized to interleave the presentation of the audio and the video of the media content. Automatically correcting the synchronization errors of the media content may include implementing an offset that modifies the interleaving or simultaneous presentation of the sound and video of the media content to avoid scenarios where a character is speaking (e.g., an open mouth facial image is detected but no audio is present). Other suitable techniques may be utilized to correct the encoding or the media content according to the determined synchronization error or modify an associated metadata file as appropriate.

Figure 4:
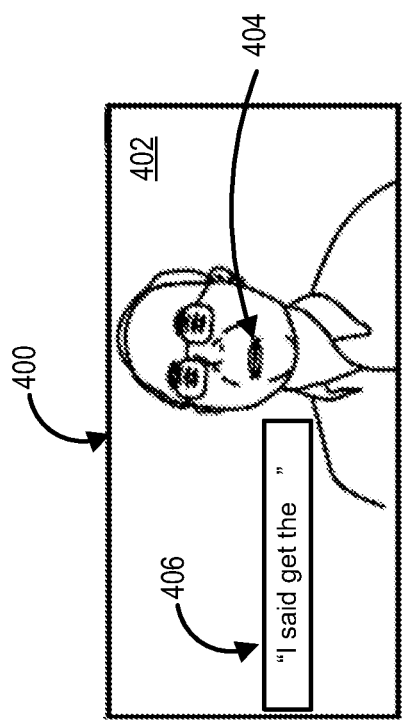
FIG. 4 illustrates an example of an identified synchronization error determined by a synchronization feature implemented by a service provider computer, in accordance with at least one embodiment.

FIG. 4 illustrates an example of an identified synchronization error determined by a synchronization feature implemented by a service provider computer, in accordance with at least one embodiment. FIG. 4 includes a representation of a video portion 400 of media content. The representation of the video portion 400 may include a video frame that further includes a facial image 402. As described herein, the service provider computers may determine that an identified or determined conversation segment includes a synchronization error based at least in part on a presence of a closed mouth facial image 404 or absence of an open mouth facial image and the presence of audio 406 in the corresponding audio frames for this portion of the media content. In accordance with at least one embodiment, if a certain number of conversation segments include similar synchronization errors, the service provider computers may designate or determine that the media content includes synchronization errors. In embodiments, once the media content has been designated as including synchronization errors, the service provider computer may notify another entity or third party to correct the synchronization error such as by modifying an encoding, a metadata file, or manually performing a corrective technique to just fix the identified conversation segments. In embodiments, the server computers implementing the synchronization feature may utilize a number of features to determine that synchronization errors are present in a ratio of video frames, such as the video frame of FIG. 4 that includes facial image 402, are associated with a presence of a closed mouth facial image 404 and the presence of audio 406. The ratio of video frames may be compared to a threshold to determine that the particular conversation segment associated with video portion 400 includes a synchronization error. The number of conversation segments that include synchronization errors may be used to determine that the corresponding media content includes a synchronization error. In embodiments, the server computers may utilize an obtained narration track to determine that a synchronization error is not present in corresponding video and audio frames include a closed mouth facial image 404 and the presence of audio 406—which may represent a narration track over a character or scene in the media content and therefore not be considered a synchronization error. In embodiments, the narration track may include information which identifies associated time codes that correspond to the video and audio frames of when the narration audio is supposed to be present in the media content to aid in identifying a potential synchronization error.

Figure 5:
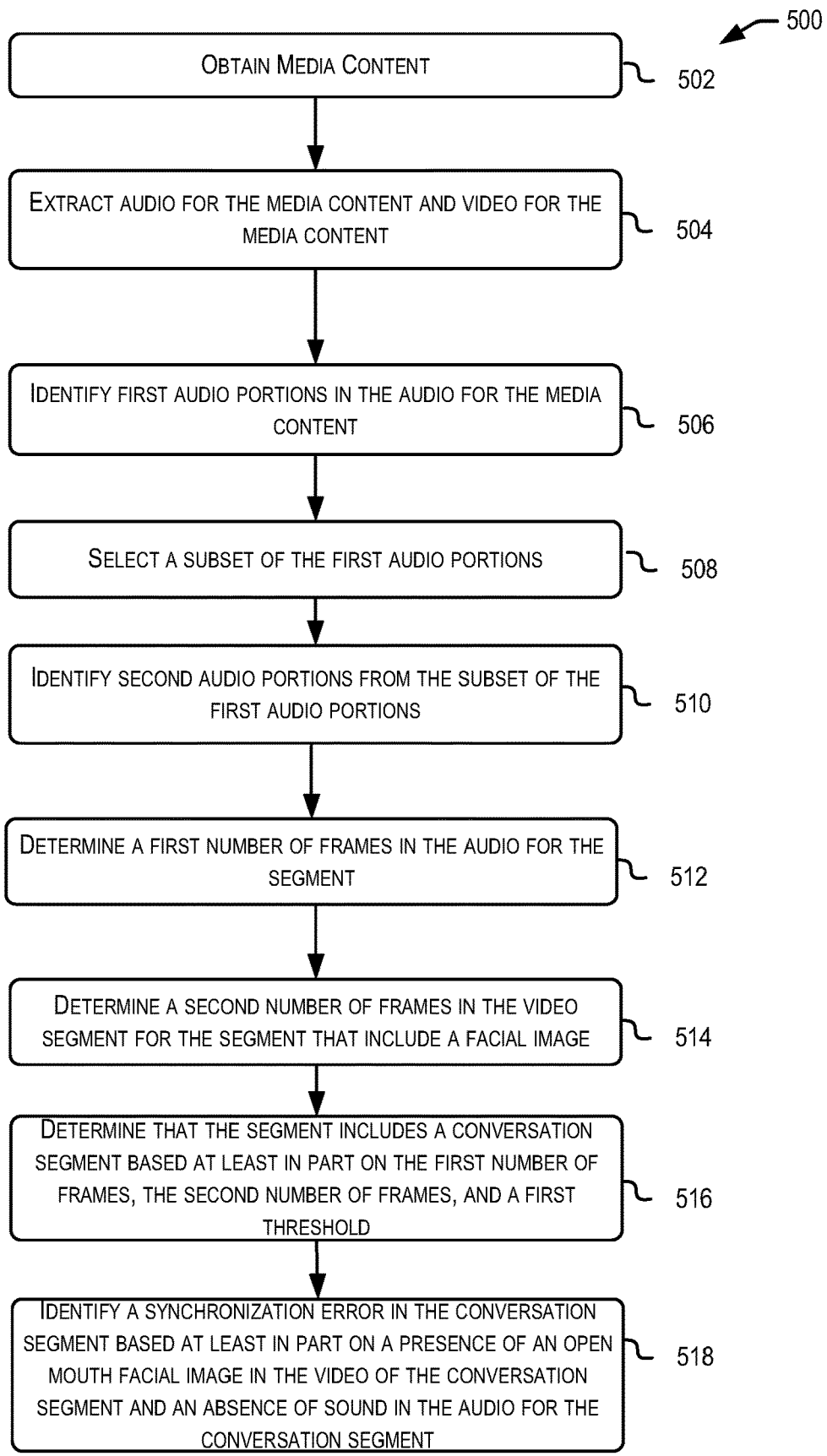
FIG. 5 illustrates an example flow chart for a synchronization feature, in accordance with at least one embodiment.
Figure 6:
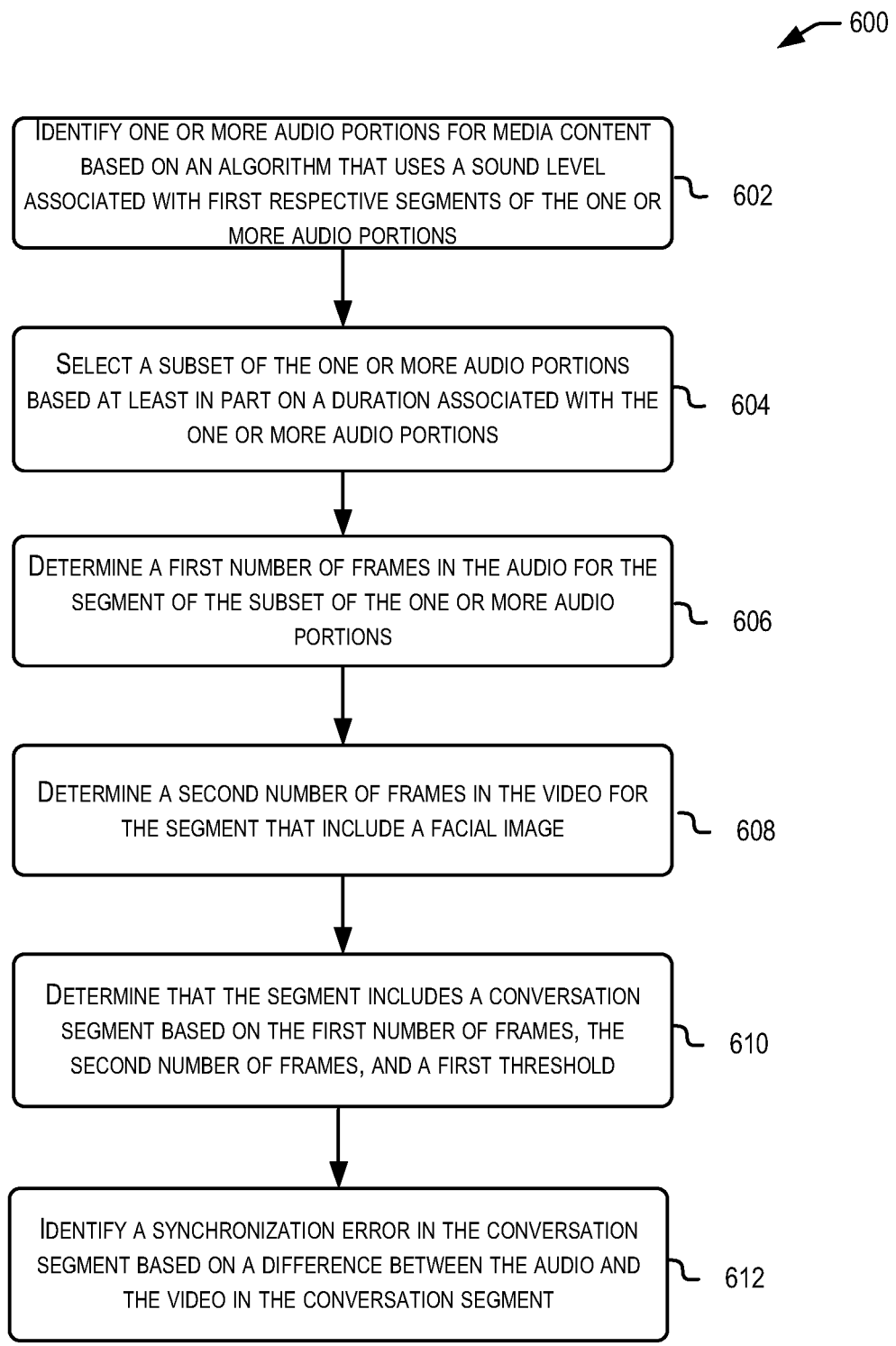
FIG. 6 illustrates an example flow chart for a synchronization feature, in accordance with at least one embodiment.

FIGS. 5 and 6 illustrate example flow charts for synchronization features, according to embodiments. These processes are illustrated as a logical flow diagram, each operation of which represents a sequence of operations that can be implemented in hardware, computer instructions, or a combination thereof In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 7:
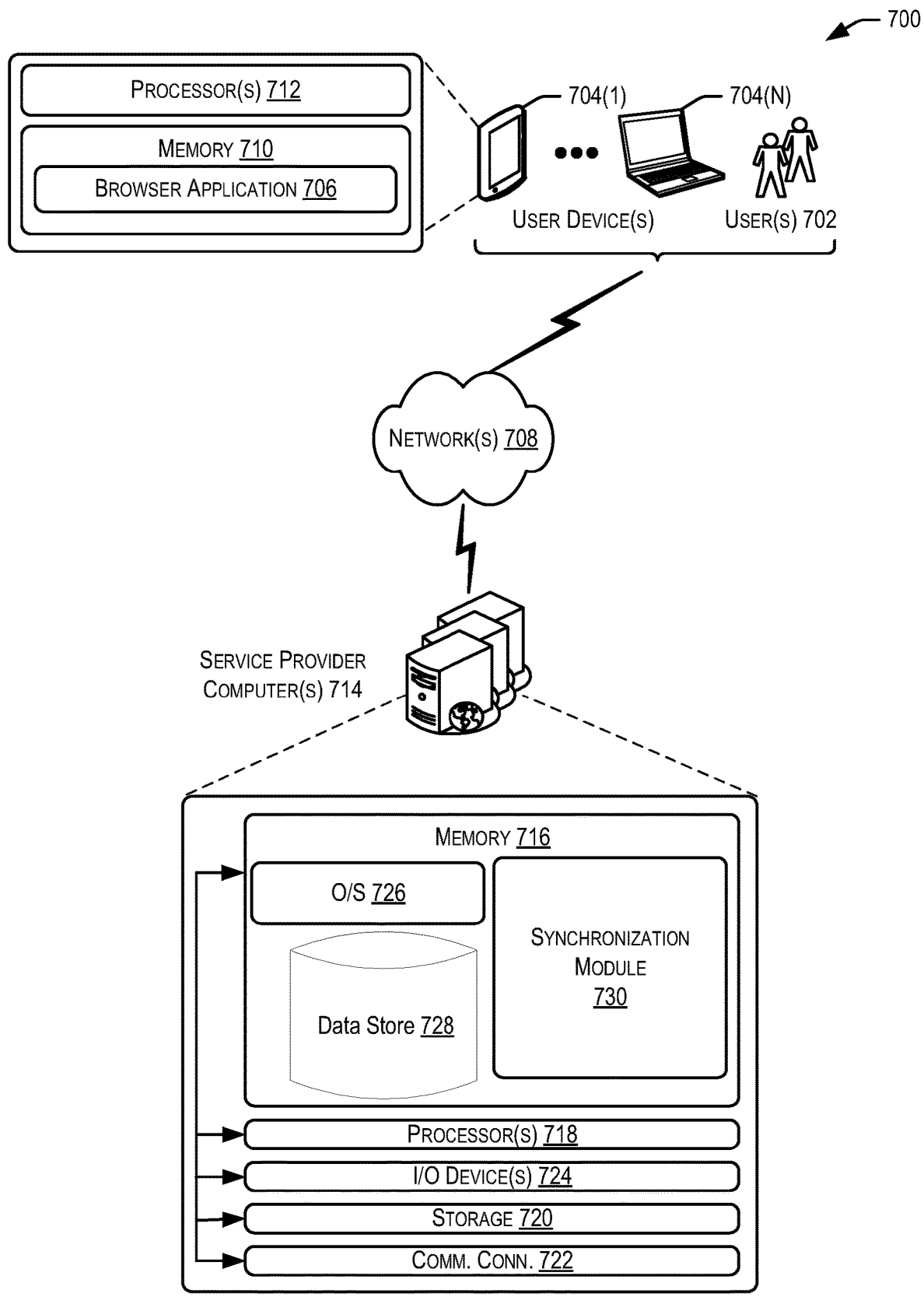
FIG. 7 illustrates an example architecture for implementing a synchronization feature, in accordance with at least one embodiment.

In some examples, service provider computers (service provider computers 714) utilizing at least the synchronization module 730 depicted in FIG. 7 may perform the processes 500 and 600 of FIGS. 5 and 6. In FIG. 5, the process 500 may include obtaining media content at 502. For example, the service provider computers may receive or obtain media content for a number of movies, TV shows, captured media streams, recorded events such as comedy specials, or other media content. In embodiments, the media content may be received from one or more third parties. The process 500 may include extracting audio for the media content and video for the media content at 504. In embodiments, the service provider computers may be configured to parse, modify, or transform the media content to extract the audio and video for the media content into separate data files. Such parsing, modifying, or transforming may include transitioning from a first data type and/or data structure to a second data type and/or data structure. In accordance with at least one embodiment, the audio of the media content may be associated with video frame information which correlates the particular frame of audio to a particular frame in the video of the media content. Metadata may also be associated with the media content which correlates the audio frames to the video frames of the media content.

The process 500 may include identifying first audio portions in the audio for the media content at 506. In embodiments, identifying the first audio portions may be based at least in part on an algorithm that uses a sound level associated with first respective segments of the first audio portions. For example, the algorithm may determine a sound level for each detected segment of audio included in a portion of the extracted audio for the media content. Based on the sound level, a service provider computer may classify the particular segment or portion of audio as quiet or silent (e.g., associated with a noise level appropriate for a conversation in the media content) or as noise (e.g., the rest of the sound in the media content that would not be associated with a noise level appropriate for a conversation in the media content). The process 500 may include selecting a subset of the first audio portions at 508. In embodiments, selecting the subset of the first audio portions may be based at least in part on a duration associated with the first audio portions. In accordance with at least one embodiment, the service provider computer can filter out portions of the audio which may potentially correspond to conversation segments based on their duration, i.e., how long the audio segment is that contains similar or the same sound levels.

The process 500 may include identifying second audio portions from the subset of the first audio portions at 510. In embodiments, the service provider computer may classify or re-classify the audio included in the subset of the first audio portions based on the respective sound levels included to accurately identify potential audio portions which correspond to conversation segments in the media content. In some embodiments, an identification of the conversation segments and determination of synchronization errors for the media content may be performed on a single classification or identification of the audio portions of the media content. The classification or identifying of the second audio portions may be based at least in part on an algorithm that uses the sound levels included in the subset of the first audio portions to again identify quiet or silent portions versus noise portions in the audio. The process 500 may include determining a first number of frames in the audio for a segment of the second respective segments of the second audio portions at 512. In embodiments, the service provider computer may identify a number of frames, using either the associated video frame information, information from associated metadata, or frames per second information associated with the media content, to count the number of frames included in the second respective segments of the second audio portions.

The process 500 may include determining a second number of frames in the video for the segment that include a facial image at 514. In embodiments, the service provider computer may utilize a facial image algorithm to identify the facial image in a video frame of the video frames of the media content. The process 500 may include determining that the segment includes a conversation segment based at least in part on the first number of frames, the second number of frames, and a first threshold at 516. As described herein, the service provider computer may determine that a portion of audio and video correspond to a conversation segment based on the number of frames of audio that are classified as quiet or silent versus the number of frames of corresponding video that include facial images exceeding, meeting, or falling below a threshold. The process 500 may include identifying a synchronization error in the conversation segment based at least in part on a presence of an open mouth facial image in the video of the conversation segment and an absence of sound in the audio for the conversation segment at 518. In embodiments, the service provider computer may also identify a synchronization error based on the presence of a closed mouth facial image in the video of the conversation segment and a presence of sound in the audio for the conversation segment. In embodiments, the service provider computer may be configured to utilize one or more algorithms or techniques to identify an open mouth or closed mouth facial image such as facial land marking algorithms.

The process 600 may include identifying one or more audio portions for media content based at least in part on an algorithm that uses a sound level associated with first respective segments of the one or more audio portions at 602. In embodiments, the audio may include video frame information that corresponds to the video of the media content. In accordance with at least one embodiment, identifying the one or more audio portions may include using a sound level associated with respective segments of the one or more audio portions. The process 600 may include selecting a subset of the one or more audio portions based at least in part on a duration associated with the one or more audio portions at 604. In embodiments, the service provider computer may filter out or parse particular portions of audio based on their associated duration or running length in the media content.

The process 600 may include determining a first number of frames in the audio for the segment of the subset of the one or more audio portions at 606. The process 600 may include determining a second number of frames in the video for the segment that include a facial image at 608. The service provider computer may utilize an algorithm that identify a facial image in the video for the segment of the media content. The video analyzed to identify the facial image may include portions of the video which correspond to the determined audio portions. The process 600 may include determining that the segment includes a conversation segment based at least in part on the first number of frames, the second number of frames, and a first threshold at 610. The process 600 may include identifying a synchronization error in the conversation segment based at least in part on a difference between the audio and the video in the conversation segment at 612.

FIG. 7 illustrates an example architecture for implementing a synchronization feature, in accordance with at least one embodiment. In architecture 700, one or more users 702 (e.g., customers, users, consumers, etc.,) may utilize user computing devices 704(1)-(N) (collectively, user devices 704) to access a browser application 706 or a user interface (UI) accessible through the browser application 706, via one or more networks 708 to request content including media content such as movies, films, TV shows, or streaming content. The "browser application" 706 can be any browser control or native application that can access and display a network page or other information such as a user interface of a native software application for enabling the selection or interaction of content such as media content. A native software application may include an application or program that has been developed for use on a particular platform (such as an operating system) or a particular device (such as a particular type of mobile device or user device 704). In embodiments, the user device 704 may include one or more components for enabling the user 702 to interact with the browser application 706.

The user devices 704 may include at least one memory 710 and one or more processing units or processor(s) 712. The memory 710 may store program instructions that are loadable and executable on the processor(s) 712, as well as data generated during the execution of these programs. Depending on the configuration and type of the user devices 704, the memory 710 may be volatile (such as random access memory (RAM)) and/or non-volatile (such as read-only memory (ROM), flash memory, etc.). The user devices 704 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 704. In some implementations, the memory 710 may include multiple different types of memory, such as static random access memory (SRAM), dynamic random access memory (DRAM), or ROM.

Turning to the contents of the memory 710 in more detail, the memory 710 may include an operating system and one or more application programs or services for implementing the features disclosed herein. Additionally, the memory 710 may include one or more modules for implementing the features described herein including the synchronization module 730.

The architecture 700 may also include one or more service provider computers 714 that may, in some examples, provide computing resources such as, but not limited to, client entities, low latency data storage, durable data store, data access, management, virtualization, hosted computing environment or "cloud-based" solutions, electronic content performance management, etc. The service provider computers 714 may implement or be an example of the service provider computer(s) described herein with reference to FIGS. 1-6 and throughout the disclosure. The one or more service provider computers 714 may also be operable to provide site hosting, computer application development, and/or implementation platforms, combinations of the foregoing, or the like to the one or more users 702 via user devices 704.

In some examples, the networks 708 may include any one or a combination of many different types of networks, such as cable networks, the Internet, wireless networks, cellular networks, and other private and/or public networks. While the illustrated examples represents the users 702 communicating with the service provider computers 714 over the networks 708, the described techniques may equally apply in instances where the users 702 interact with the one or more service provider computers 714 via the one or more user devices 704 over a landline phone, via a kiosk, or in any other manner. It is also noted that the described techniques may apply in other client/server arrangements (e.g., set-top boxes, etc.), as well as in non-client/server arrangements (e.g.., locally stored applications, peer-to-peer arrangements, etc.).

The one or more service provider computers 714 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 714 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 714 may be in communication with the user device 704 via the networks 708, or via other network connections. The one or more service provider computers 714 may include one or more servers, perhaps arranged in a cluster or as individual servers not associated with one another.

In one illustrative configuration, the one or more service provider computers 714 may include at least one memory 716 and one or more processing units or processor(s) 718. The processor(s) 718 may be implemented as appropriate in hardware, computer-executable instructions, firmware, or combination thereof. Computer-executable instruction or firmware implementations of the processor(s) 718 may include computer-executable or machine-executable instructions written in any suitable programming language to perform the various functions described when executed by a hardware computing device, such as a processor. The memory 716 may store program instructions that are loadable and executable on the processor(s) 718, as well as data generated during the execution of these programs. Depending on the configuration and type of the one or more service provider computers 714, the memory 716 may be volatile (such as RAM) and/or non-volatile (such as ROM, flash memory, etc.). The one or more service provider computers 714 or servers may also include additional storage 720, which may include removable storage and/or non-removable storage. The additional storage 720 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 716 may include multiple different types of memory, such as SRAM, DRAM, or ROM.

The memory 716, the additional storage 720, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 716 and the additional storage 720 are all examples of non-transitory computer storage media. Additional types of non-transitory computer storage media that may be present in the one or more service provider computers 714 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 714. Combinations of any of the above should also be included within the scope of non-transitory computer-readable media.

The one or more service provider computers 714 may also contain communication connection interface(s) 722 that allow the one or more service provider computers 714 to communicate with a data store, another computing device or server, user terminals, and/or other devices on the networks 708. The one or more service provider computers 714 may also include I/O device(s) 724, such as a keyboard, a mouse, a pen, a voice input device, a touch input device, a display, speakers, a printer, etc.

Turning to the contents of the memory 716 in more detail, the memory 716 may include an operating system 726, one or more data stores 728, and/or one or more application programs or services for implementing the features disclosed herein including the synchronization module 730. In accordance with at least one embodiment, the synchronization module 730 may be configured to at least extract audio and video from received or obtained media content, classify or identify sounds included in the audio for the media content to correspond to quiet (e.g., potential audio signals that are associated with a conversation) or noise (e.g., the rest of the audio of the media content that is not associated with a conversation), apply or implement one or more smoothing functions to the classified portions of the audio, extract portions of the audio which exceed a certain duration, classify the audio included in the further extracted portions of audio (quiet versus noise), identify a synchronization error between the frames of audio and corresponding video of the media content based at least in part on a number of silent frames in a conversation segment, and modify metadata for the media content or modify an encoding of the media content to correct any identified synchronization errors as described herein. In embodiments, the synchronization module 730 may be configured to identify a number of frames in the video of the media content which contain facial images by implementing a facial recognition algorithm or other suitable techniques to identify faces in the video of the media content.

In embodiments, the synchronization module 730 may be configured to implement a facial land marking algorithm to determine a presence of open mouthed facial images or closed mouth facial images. In accordance with at least one embodiment, the synchronization module 730 may implement a deep neural network that is trained to identify open mouth facial images or closed mouth facial images. Other suitable techniques may be implemented and utilized to identify the presence or absence of open mouth facial images and closed mouth facial images in the video of the media content. The synchronization module 730 may be configured to determine whether a portion of audio and video corresponds to a conversation segment based at least in part on a number of frames that include quiet audio versus the number of frames of video that include facial images and a threshold. For example, if the percentage of quiet audio frames versus video frames which include facial images exceeds the threshold than the corresponding audio and video are determined to include a conversation segment within the media content. In embodiments, the synchronization module 730 may generate and transmit reports of the identified errors to the user device 704 via networks 708 for further processing.

Figure 8:
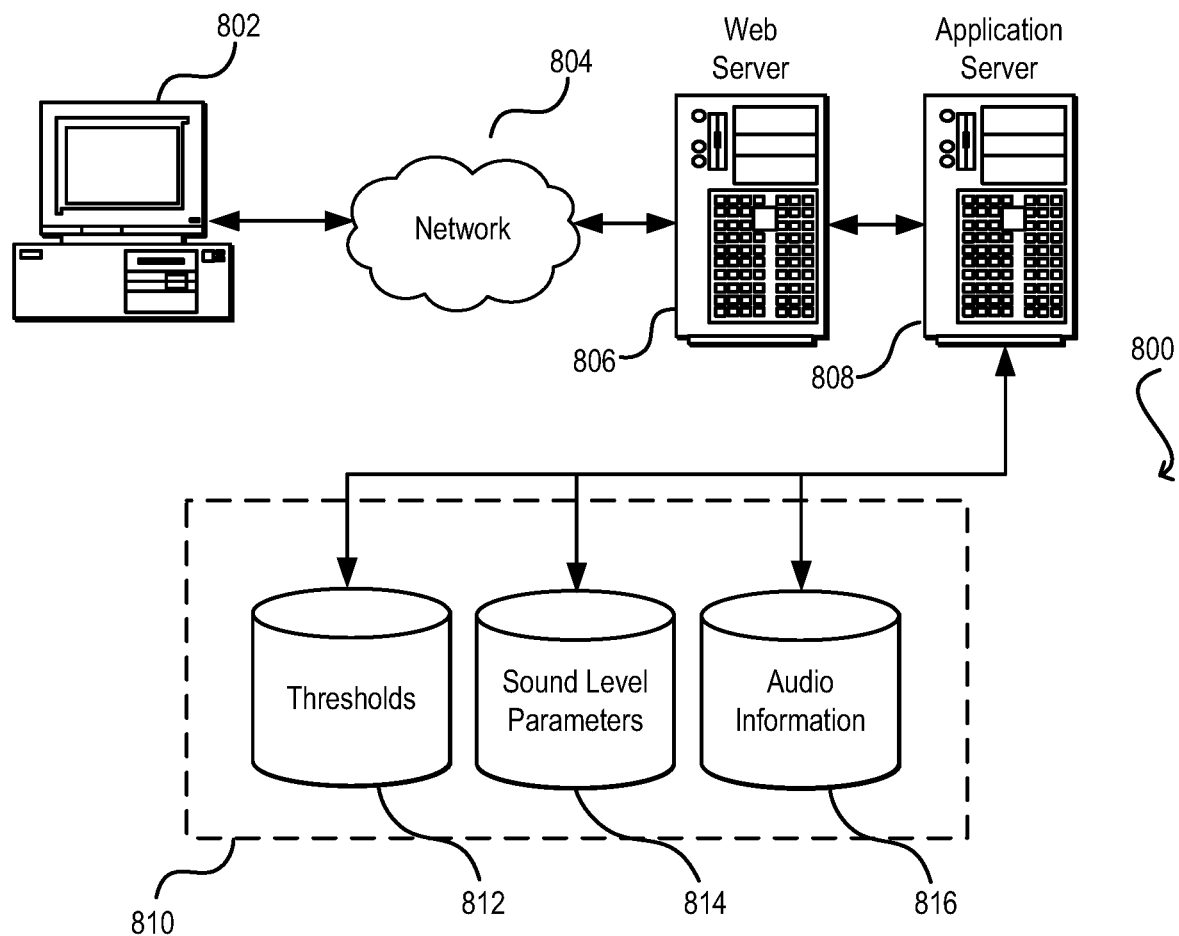
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing one or more thresholds 812 and audio information 816, which can be used to serve content for the production side, identify synchronization errors in media content, and select or determine a threshold for classifying sounds included in the audio of media content as well as a threshold for determining whether media content includes a synchronization error based on an analysis of conversation segments for the media content. The data store also is shown to include a mechanism for storing sound level parameters 814, which can be used for reporting, analysis, or other such purposes such as classifying sounds included in audio for media content as either being associated with a conversation or other noise. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure. The environment in the embodiment that is a distributed computing environment can process one or more conversation segments determined for media content in parallel such as by performing parallel processing and analyzing conversation segments simultaneously by different virtual instances implemented by the distributed computing environment thereby leading to efficient identification and analysis of the media content for synchronization errors.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
   obtaining, by a server computer, audio and video corresponding to media content;
   identifying, by the server computer, audio segments from a plurality of audio segments of the audio based at least in part on: 1) identifying, from the plurality of audio segments, a first subset of audio segments that have a sound level that falls below a sound level threshold, 2) determining, from the first subset of audio segments, a second subset of audio segments that exceed a threshold duration, and 3) selecting, from the second subset of audio segments, a third subset of audio segments, the third subset of audio segments being selected based at least in part on identifying that a number of frames of a given audio segment that individually have sound levels that fall below the sound level threshold exceeds a threshold number;
   determining, by the server computer, that an audio segment of the identified audio segments corresponds to a conversation segment of the media content based at least in part on identifying that a number of audio frames of the audio segment that: 1) have respective sound levels that fall below the threshold sound level and 2) correspond to video frames of the media content that comprise a facial image, exceeds a second threshold number;
   identifying, by the server computer, a synchronization error in the conversation segment based at least in part on identifying that a second number of frames of the conversation segment correspond to video comprising open mouth facial images and corresponding audio that lacks sounds exceeds a second threshold, the second threshold determined based at least in part on a type of media content corresponding to the media content; and
   in response to identifying the synchronization error, modifying, by the server computer, at least one of: 1) an encoding file of the media content or 2)
   metadata of the media content, the modifying of the metadata of the media content comprising modifying one or more associations between audio frames and corresponding video frames of the conversation segment.

2. A non-transitory computer-readable storage medium storing computer-executable instructions that, when executed by a computer system, cause the computer system to perform operations comprising:
   obtaining audio and video corresponding to media content;
   identifying audio portions from a plurality of audio segments of audio for the media content based at least in part on: 1) identifying, from the plurality of audio segments, a first subset of audio segments that have a sound level that falls below a sound level threshold, 2) determining, from the first subset of audio segments, a second subset of audio segments that exceed a threshold duration, and 3) selecting, from the second subset of audio segments, a third subset of audio segments, the third subset of audio segments being selected based at least in part on identifying that a number of frames of a given audio segment that individually have sound levels that fall below the sound level threshold exceeds a threshold number;
   determining that an audio portion of the identified audio portions corresponds to a conversation segment of the media content based at least in part on identifying that a number of audio frames of the audio portion that: 1) have respective sound levels that fall below the threshold sound level and 2) correspond to video frames that comprise a facial image, exceeds a second threshold number;
   identifying a synchronization error in the conversation segment based at least in part on identifying that a second number of frames of the conversation segment correspond to video comprising open mouth facial images and corresponding audio that lacks sounds exceeds a second threshold, the second threshold determined based at least in part on a type of media content corresponding to the media content; and
   in response to identifying the synchronization error, modifying at least one of: 1) an encoding file of the media content or 2)
   metadata of the media content, the modifying of the metadata of the media content comprising modifying one or more associations between audio frames and corresponding video frames of the conversation segment.

3. The non-transitory computer-readable storage medium of claim 2, wherein the computer-executable instructions, when executed by the computer system further cause the computer system to perform operations comprising implementing a facial land marking algorithm to detect an open mouth facial image in the video of the conversation segment.

4. The non-transitory computer-readable storage medium of claim 2, wherein a difference between the audio and the video of the conversation segment includes a second difference between the video and an expected audio for video frames corresponding to the video of the conversation segment.

5. The non-transitory computer-readable storage medium of claim 4, wherein the expected audio is expected to include sound in the audio of the conversation segment when an open mouth facial image is identified in the video of the conversation segment, or the expected audio is expected to lack sound in the audio of the conversation segment when a closed mouth facial image is identified in the video of the conversation segment.

6. The non-transitory computer-readable storage medium of claim 2, wherein identifying the first subset of audio segments that have the sound level that falls below the sound level threshold utilizes a smoothing function.

7. The non-transitory computer-readable storage medium of claim 2, wherein identifying the first subset of audio segments that have the sound level that falls below the sound level threshold comprises utilizing a deep neural network algorithm that is trained using sound levels associated with a plurality of media content.

8. The non-transitory computer-readable storage medium of claim 2, wherein the first threshold number is specified by an entity associated with the media content.

9. A computer system comprising:
   a memory configured to store computer-executable instructions; and
   a processor in communication with the memory configured to execute the computer-executable instructions to at least:
      obtain audio and video corresponding to media content;
      identify audio portions from a plurality of audio segments of audio for the media content based at least in part on: 1) identifying, from the plurality of audio segments, a first subset of audio segments that have a sound level that falls below a sound level threshold, 2) determining, from the first subset of audio segments, a second subset of audio segments that exceed a threshold duration, and 3) selecting, from the second subset of audio segments, a third subset of audio segments, the third subset of audio segments being selected based at least in part on identifying that a number of frames of a given audio segment that individually have sound levels that fall below the sound level threshold exceeds a threshold number;
      determine that an audio portion of the identified audio portions corresponds to a conversation segment of the media content based at least in part on identifying that a number of audio frames of the audio portion that: 1) have respective sound levels that fall below the threshold sound level and 2) correspond to video frames that comprise a facial image, exceeds a second threshold number;
      identify a synchronization error in the conversation segment based at least in part on identifying that a second number of frames of the conversation segment correspond to video comprising open mouth facial images and corresponding audio that lacks sounds exceeds a second threshold, the second threshold determined based at least in part on a type of media content corresponding to the media content; and
      in response to identifying the synchronization error, modify at least one of: 1) an encoding file of the media content or 2)
      metadata of the media content, the modifying of the metadata of the media content comprising modifying one or more associations between audio frames and corresponding video frames of the conversation segment.

10. The computer system of claim 9, wherein identifying that the corresponding audio lacks sounds is based at least in part on the sound level for the conversation segment.

11. The computer system of claim 9, wherein the processor is further configured to execute the computer-executable instructions to at least identify the synchronization error in the conversation segment based at least in part on identifying a closed mouth facial image in the video of the conversation segment and respective audio corresponding to the closed mouth facial image in the video of the conversation segment includes sound.

12. The computer system of claim 9, wherein the duration of the conversation segment is less than the duration of the media content.

13. The computer system of claim 9, wherein determining that the audio portion of the identified audio portions correspond to the conversation segment is further based at least in part on another duration.

14. The computer system of claim 9, wherein identifying the audio portions from the plurality of audio segments of the audio includes identifying a plurality of transition points in the audio.

* * * * *